Dec. 23, 1941.        W. F. PECK        2,266,798
APPARATUS FOR EXERCISING AND TRAINING EYES
Filed Sept. 5, 1939         7 Sheets-Sheet 1
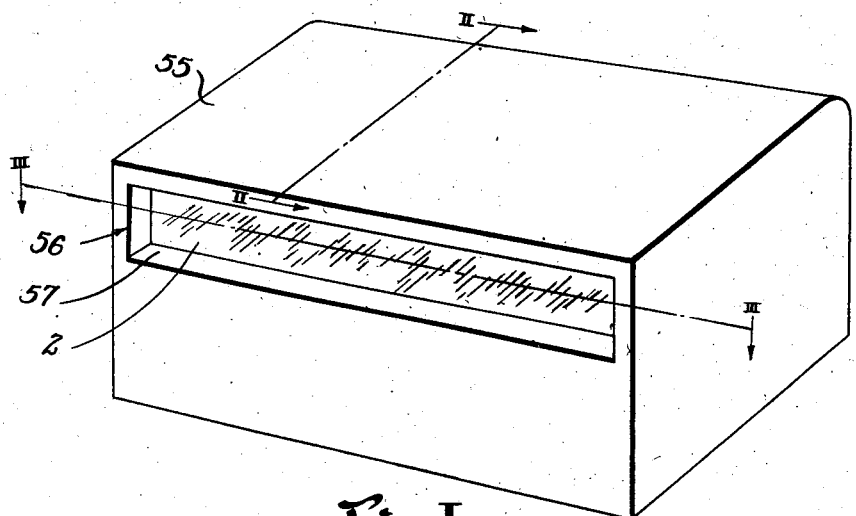
Fig. I
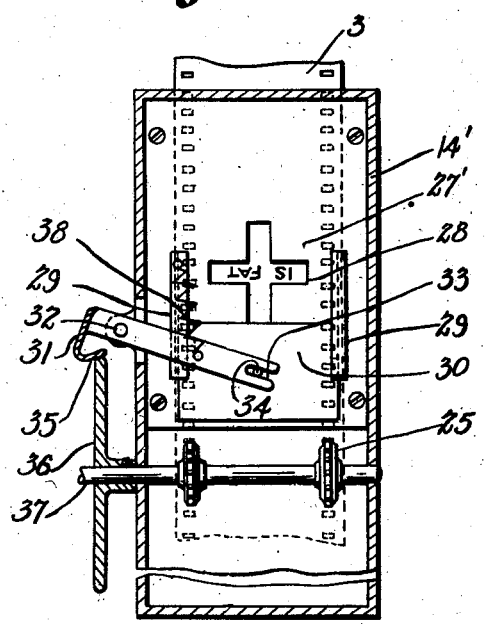
Fig. V
INVENTOR.
WILLIAM F. PECK
BY Harry H. Styll
ATTORNEY.

Dec. 23, 1941.  W. F. PECK  2,266,798
APPARATUS FOR EXERCISING AND TRAINING EYES
Filed Sept. 5, 1939  7 Sheets-Sheet 2
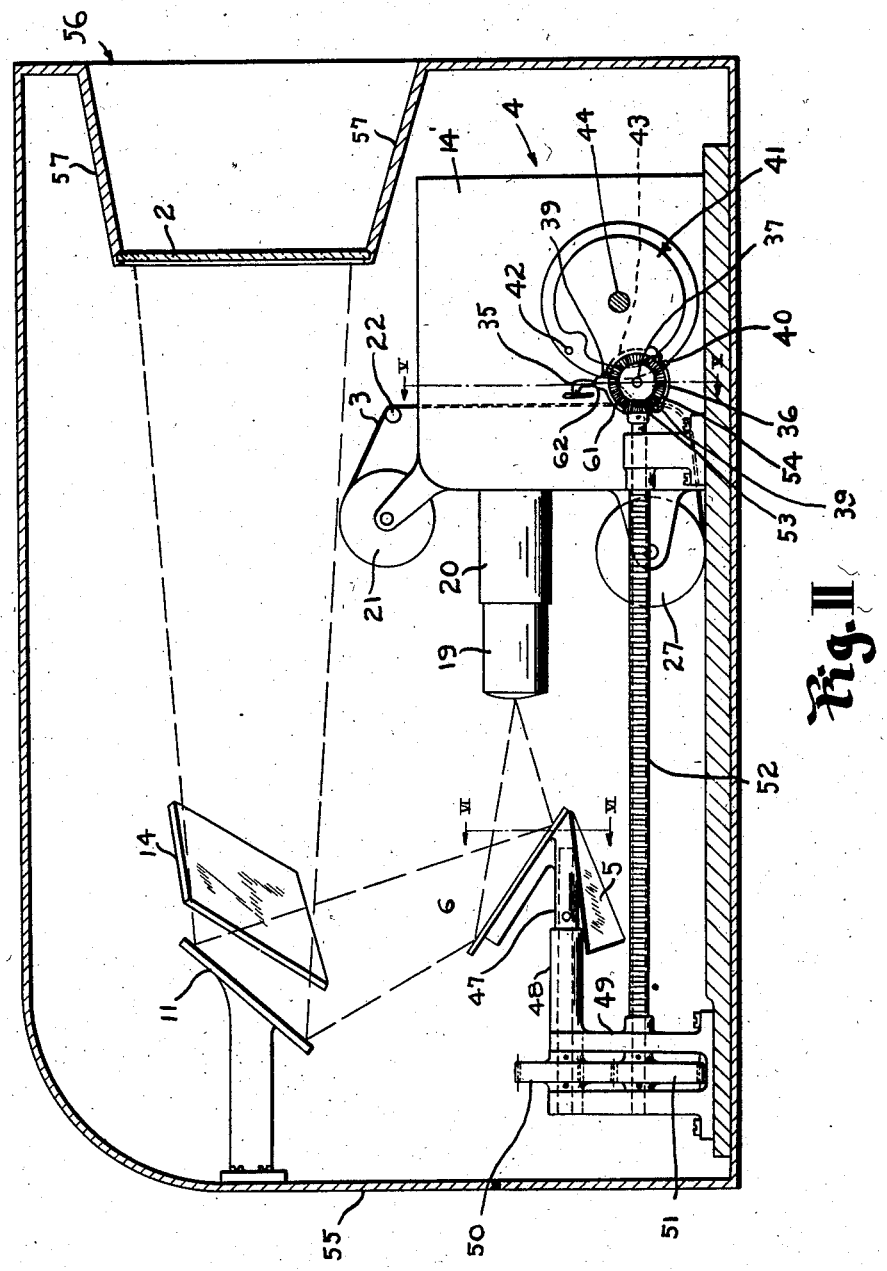
INVENTOR.
WILLIAM F. PECK
BY Harry H. Still
ATTORNEY.

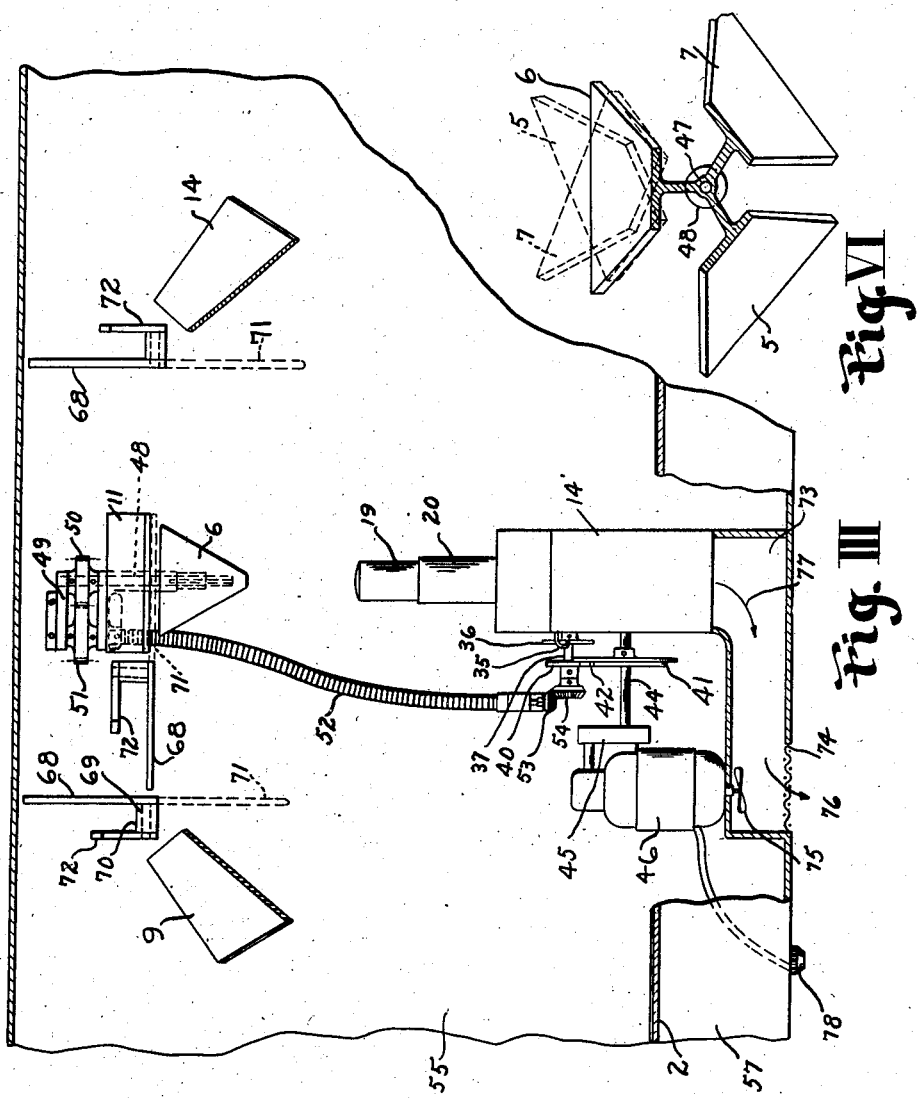

Dec. 23, 1941.    W. F. PECK    2,266,798
APPARATUS FOR EXERCISING AND TRAINING EYES
Filed Sept. 5, 1939    7 Sheets-Sheet 4
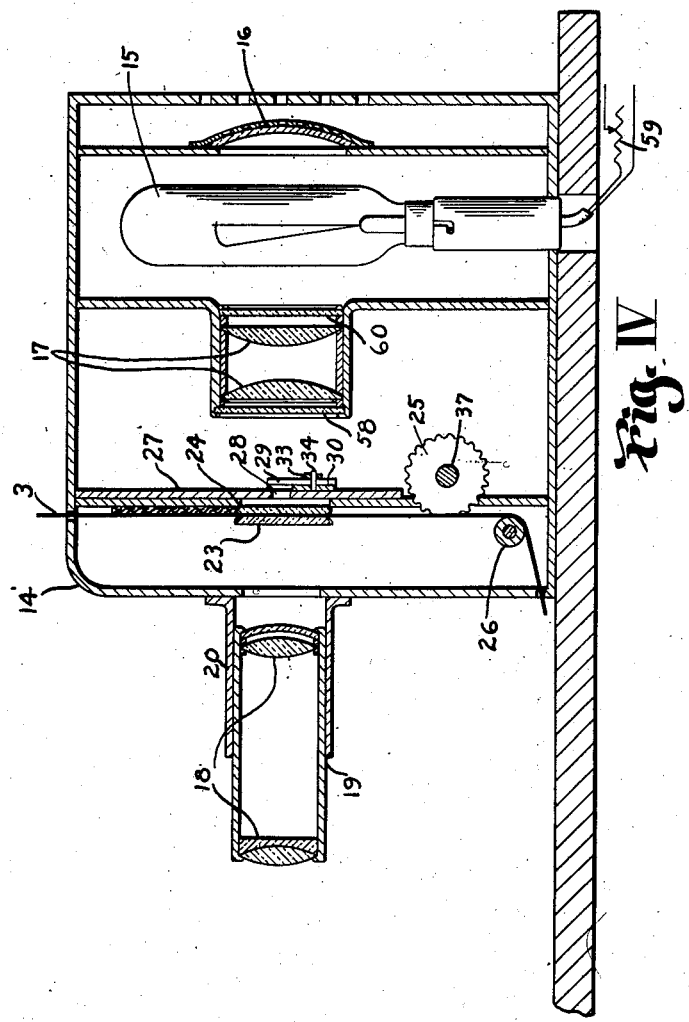
Fig. IV.
INVENTOR.
WILLIAM F. PECK
BY Harry H. Still.
ATTORNEY.

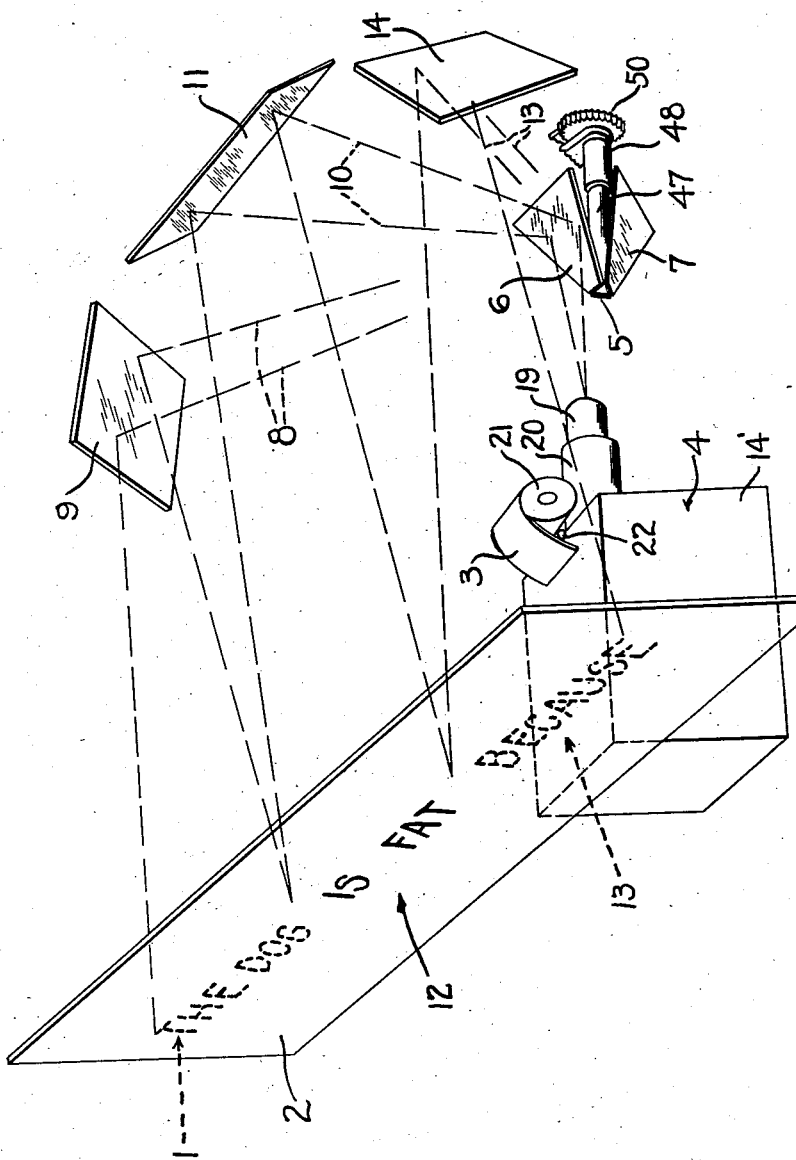
Dec. 23, 1941.     W. F. PECK     2,266,798
APPARATUS FOR EXERCISING AND TRAINING EYES
Filed Sept. 5, 1939     7 Sheets-Sheet 5
Fig. VII
INVENTOR.
WILLIAM F. PECK
BY Harry H. Still
ATTORNEY.

Dec. 23, 1941.   W. F. PECK   2,266,798
APPARATUS FOR EXERCISING AND TRAINING EYES
Filed Sept. 5, 1939   7 Sheets-Sheet 6
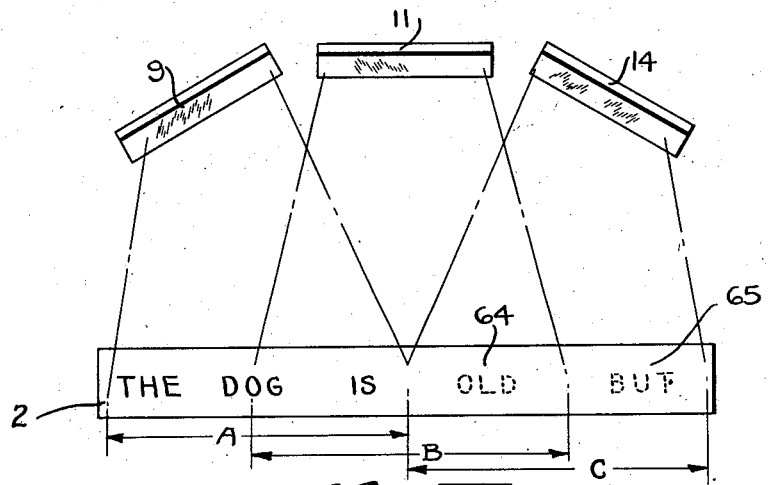
Fig. VIII
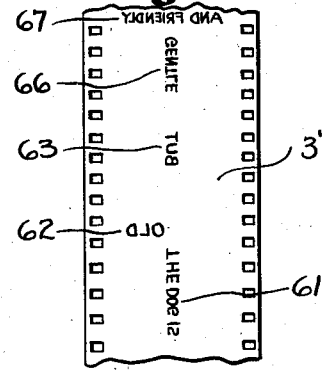
Fig. IX
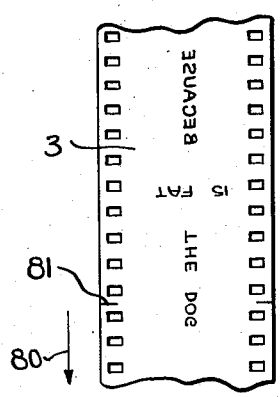
Fig. XII
INVENTOR.
WILLIAM F. PECK
BY Harry H. Styll.
ATTORNEY.

Dec. 23, 1941.  W. F. PECK  2,266,798
APPARATUS FOR EXERCISING AND TRAINING EYES
Filed Sept. 5, 1939  7 Sheets—Sheet 7
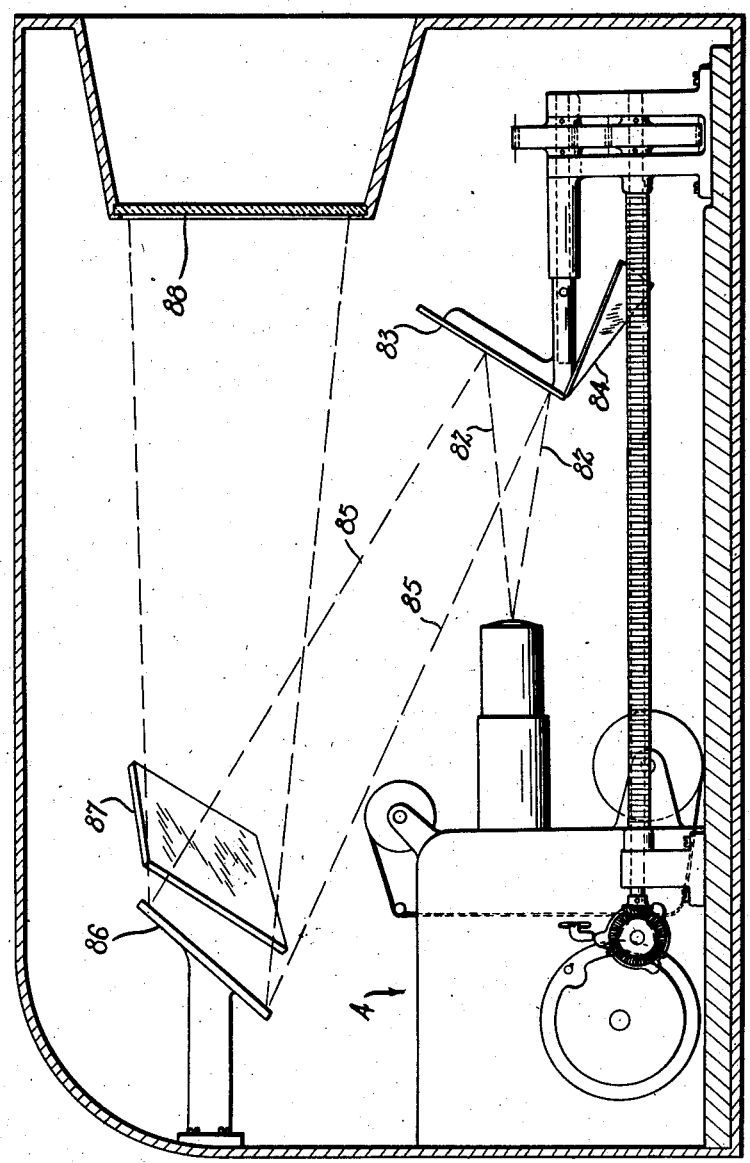
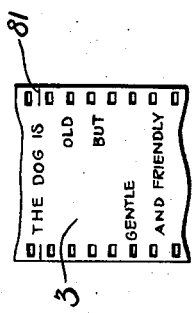
INVENTOR.
WILLIAM F. PECK
BY Harry H. Styll.
ATTORNEY.

Patented Dec. 23, 1941

2,266,798

UNITED STATES PATENT OFFICE 2,266,798

APPARATUS FOR EXERCISING AND TRAINING EYES

William F. Peck, Kenmore, N. Y., assignor to American Optical Company, Southbridge, Mass., a voluntary association of Massachusetts Application September 5, 1939, Serial No. 293,463

7 Claims. (Cl. 35—29)

This invention relates to a novel apparatus for exhibiting reading indicia or symbols or groups of said indicia or symbols in progressive sequence in the direction of reading for exercising and training the eyes of individuals viewing said indicia or symbols.

This application is a continuation in part of my copending application Serial No. 207,527 filed May 12, 1938.

One of the principal objects of the invention is to provide a novel apparatus for exhibiting fixation indicia or symbols in progressive sequence in the direction of reading, with none of the moving mechanical parts of said apparatus being visible during said exhibitions.

Another object of the invention is to provide a novel apparatus for training the reading habits of individuals wherein the said means bringing about such training may be viewed by a large or small number of individuals.

Another object is to provide a novel means for projecting fixation indicia or symbols in progressive sequence in the direction of reading wherein the necessity of wide angle projection will be eliminated.

Another object is to provide a projection apparatus facilitating such training in reading habits wherein a compact film having the projection indicia or symbols thereon may be used and with which the span of projection may be controlled.

Another object is to provide a greatly simplified construction of apparatus for facilitating the exercising of eyes and training of reading habits.

Another object is to provide a simplified apparatus for accomplishing all of the objects and advantages of the device disclosed and claimed in Re. Patent No. 20,223, issued December 29, 1936.

Another object is to provide combined projection and reflection means for accomplishing the above results.

Other objects and advantages of the invention should become apparent from the following description taken in combination with the accompanying drawings and it will be apparent that many changes may be made in the details of construction, arrangement of parts, and methods shown and described, without departing from the spirit of the invention as expressed in the accompanying claims.

I, therefore, do not wish to be limited to the exact details of construction, arrangement of parts, and method shown and described, as the preferred form only has been given by way of illustration.

Referring to the drawings:

Fig. I is a perspective view of the device embodying the invention;

Fig. II is an enlarged sectional view taken as on line II—II of Fig. I and looking in the direction of the arrows;

Fig. III is a fragmentary sectional view taken as on line III—III of Fig. I and looking in the direction indicated by the arrows;

Fig. IV is an enlarged sectional view of the projection apparatus;

Fig. V is a fragmentary slightly enlarged sectional view taken as on line V—V of Fig. II;

Fig. VI is an enlarged fragmentary sectional view taken as on line VI—VI of Fig. II and looking in the direction indicated by the arrows;

Fig. VII is a diagrammatic perspective view illustrating the function of the reflective system;

Fig. VIII is a diagrammatic view illustrating a modified arrangement whereby the length of the span of the projected indicia may be varied;

Fig. IX is a fragmentary face view of a film illustrating the amount and position of indicia which is to be projected at each framing of the projection device and by which the length of the recognition span of the projected indicia may be varied;

Fig. X is a view generally similar to Fig. II showing a further modification of the invention;

Fig. XI is a face view of a section of film used with the arrangement set forth in Fig. X; and Fig. XII is a face view of a section of film utilized with the device illustrated in Figs. I to VII inclusive and for producing the recognition spans illustrated in Fig. VII.

The apparatus shown is intended to be merely illustrative of the invention, inasmuch as there are various systems of projection to which the invention is adaptable. In the particular form of apparatus shown, in Fig. VII, the reading matter or symbols 1 are thrown upon a translucent screen 2 from behind, so that the individual may view said reading matter or indicia from the front of said device.

The reading matter or symbols which it is desired to be viewed are carried by a film 3 and, as shown in Fig. VII, are intermittently projected by a suitable projector 4 onto reflective means such as mirrors 5, 6 and 7, the first projection is illustrated by dash lines 8, to direct the projected rays of light onto an angled reflector 9 which, in turn, directs the said rays toward the translucent screen 2 and thereby projects the desired indicia or symbols on the left section of said screen.

The film 3 is then advanced an amount sufficient to bring the next desired reading matter or symbols in line with the projection system of the projector 4 and the mirror 6 is then simultaneously rotated into position to reflect the projected rays of light 10 onto another angled reflector 11 which directs the said projected rays toward the translucent screen 2 and thereby produces the next exhibited section of indicia 12 throughout the intermediate area of said translucent screen. It is to be understood that prior to the shifting of the film 3 and mirror 6, the image movement on the screen is obscured by means of a shutter. The film 3 is again moved by suitable mechanism, which will hereinafter be described in detail, an amount sufficient to bring the next desired reading matter or symbols in line with the projection system of the projector 4, and the mirror 7 is simultaneously rotated to a position to receive the projected light rays and direct the said rays as indicated at 13 toward another reflector 14 which directs the said rays toward the translucent screen and produces the next exhibited section of reading matter or symbols on the section or area of the translucent screen to the right side of said screen.

Continued operation of the projection apparatus and mirrors 5, 6 and 7 brings about a repetition of the said intermittently and progressively exhibited sections of reading matter or symbols.

The projection apparatus as illustrated in Figs. II, III, and IV comprises broadly a housing or casing 14' having a suitable source of illumination 15 therein. Internally of said housing and in the rear of said source of illumination there is provided a suitable parabolic reflector 16 for directing a portion of the light toward the projection system. The projection system comprises a set of condensing lenses 17, spherical or cylindrical, and projection lenses 18. The said projection lenses are mounted in a tubular member 19, which is adjustably supported to slide longitudinally of a support 20 carried by the casing 14.

The film 3 is carried by a suitable film roll 21. The said film extends over a suitable roller 22 and thence inwardly of the casing 14' and between suitable supporting plates of glass or the like 23 and 24 inwardly of said casing and in line with the projected rays of light. The film progresses from said plates 23 and 24 downwardly into engagement with suitable sprocket wheels 25, over another roller 26 and thence on to a take-up reel 27.

The casing is provided with an inner partition 27' between the condensing lens system 17, and projection lenses 18, which is provided with a framing opening 28 in line with the projected rays of light.

The partition 27' is provided with guideways 29 adjacent the framing opening 28 in which a baffle plate 30 is slidably mounted. The said baffle plate 30 is supported to be moved into and out of alignment with the opening 28 and this movement is brought about by a rock lever 31, Fig. V, which is pivoted at 32 to the partition 27'. The said rock lever is provided adjacent its inner end with a slot 33 which engages a pin 34 carried by the baffle plate 30.

The opposite end 35 of said lever 31 engages an operating cam 36 carried by the shaft 37 on which the sprocket wheels 25 are mounted. A spring 38 normally urges the slotted end 33 of the lever in an up direction and thereby normally urges the baffle 30 to a position wherein it will overlie the opening 28. The cam 36 which, as shown in Fig. II, is provided with a plurality of risers 39, moves the end 35 upwardly against the resilient action of the spring 38. The cam 36 is intermittently rotated by means of a star wheel 40 mounted on the shaft 37. The said star wheel is intermittently rotated by a Geneva wheel 41 having a pin 42 which intermittently engages the slotted portions 43 of the star wheel 40. The Geneva wheel 41 is mounted on a shaft 44 which is continuously rotated through a reduction gear system 45 by a suitable motor 46. The speed of rotation and size of said wheel 41 are such as to produce the time intervals desired between said intermittent movements of the cam 36. As the cam 36 is rotated the risers 39 thereon intermittently engage and disengage the end 35 of the lever 31 and thereby intermittently move the baffle plate 30 into and out of alignment with the opening 28.

The mirrors 5, 6 and 7 are mounted on a shaft 47 mounted in a bearing 48 carried by a support 49. The said shaft 47 is rotated by means of a gear 50 which meshes with a gear 51 carried by a flexible shaft 52. The shaft 52 has a suitable gear 53 meshing with a suitable gear 54 carried by the shaft 37. It will be seen therefore that when the shaft 37 is intermittently rotated by the Geneva mechanism, the beveled gear 54 meshing with the beveled gear 53 will simultaneously rotate the shaft 52 and in turn rotate the mirrors 5, 6 and 7 carried by the shaft 47. The ratio of the gearing is such as to rotate the respective mirrors 5, 6 and 7 the desired amounts.

It will be noted that the mirror 5 is rotated to the position indicated in dash lines in Fig. VI. The position to which the mirror 6 is rotated is illustrated in full lines and the position to which the mirror 7 is rotated is indicated in dash lines.

The projector 4 and the various mirrors and operating mechanism are encased within a housing 55 having a window opening 56 in the front thereof with which the translucent screen 2 is aligned and supported by the inwardly extending walls 57.

The intensity of the illumination may be controlled by suitable filters or the like 58 or through the provision of a rheostat or the like 59, see Fig. IV.

A suitable heat screen or the like 60 having infra-red absorptive means such as ferrous iron or the like may be supported between the condensing lenses 17 and source of illumination 15 if desired, or one of the said condensing lenses 17 may be provided with such absorptive properties. This would prevent the film 3 from becoming overheated during the use of the device.

The arrangement, illustrated in Figs. I to VII inclusive, is such that an image rotation is introduced by the reflective system thereof. This image rotation is compensated for by utilizing a film, such as illustrated in Fig. XII, so that the reading on the screen 2 will be as illustrated in Fig. VII. It is to be understood that the mirrors 5, 6 and 7 and the respective mirrors 9, 11 and 14 are so arranged to cooperatively function with a film 3, such as illustrated in Fig. XII, to cause the separate sections of reading matter or symbols to be exposed successively in a single line in the direction of reading. The film normally travels in the direction indicated by the arrow 80 so that the first span of recognition; namely, "the dog" will be exposed at the left of the screen, as illustrated by dotted lines in Fig. VII, the second recognition span; namely "is fat" will be exposed at the center of the screen 2, as illustrated in full lines in Fig. VII, and the third recognition span; namely "because" will be exposed at the right of the screen with all of said recognition spans lying in line with each other.

To vary the recognition span, as illustrated in Fig. VIII, a film, such as illustrated in Fig. IX, is used.

To facilitate ease of framing at the initial start of the film the film may be provided with suitable indication means 81. The mirrors are so set and the portions of indicia, or reading matter, forming each recognition span on the film are so arranged that after one complete circuit of movement of the mirrors 5, 6 and 7 has been completed, resulting in the successive intermittent exhibitions of indicia or reading matter from left to right on the screen, the said left to right exhibitions will be repeated through another circuit of movement of said mirrors and through a repetitive arrangement of the indicia on the film for cooperative function with said mirrors. It is to be noted that the framing opening 28 is, in this instance, made in the form of a cross whereby each specific set of indicia may be suitably framed.

In Fig. X these is illustrated a further modification wherein the light rays, as illustrated by the dash lines 82, are initially projected toward the front of the apparatus, then reflected by means of a plurality of reflectors 83 and 84, etc., as illustrated by the dash line 85, simulating the reflectors 5, 6 and 7, toward the rear of the apparatus. The rearwardly reflected light rays are then directed by means of a plurality of reflectors 86, 87, etc., toward the front of the apparent and onto the translucent screen 88 simualting the screen 2. With this arrangement the reversal and rotation of image, such as set forth above, does not take place. It is to be understood, however, that the mirrors must be arranged so as to eliminate rotation, this may be brought about by control of the respective angles of the various mirrors. A film, such as illustrated in Fig. XI, may be used with this arrangement. This film, of course, is laid out to bring about the control of the recognition span, such as illustrated in Fig. VIII, but in instances wherein the said recognition spans are of substantially the same size they may be of equal lengths on the film and progressively arranged.

It is to be understood that the layouts of the various films are only by way of illustration as to how the desired results may be obtained. It may, in some instances, be desirable to alter said layouts according to the particular arrangement of mirrors used.

The operating mechanism of the device, illustrated in Fig. X, is generally similar to that described above in connection with the device illustrated in Figs. I to VII inclusive.

It is to be understood that when a film, such as illustrated in Fig. XI, is used the framing opening 28 is shaped accordingly. In this particular instance it would only require the use of a horizontally extending framing opening. Suitable aligning indicia 81 may also be provided on the film 3, as illustrated in Fig. XI. It is also to be understood that the shutter arrangement, such as illustrated at 68 to 72 inclusive, of Fig. III, may be used in connection with the reflectors 86, 87 and so forth.

The operation of the device, illustrated in Figs. I to VII inclusive, is substantially as follows:

A film 3 having the desired reading matter or fixation symbols thereon is placed in the projector. The source of illumination 15 is turned on and the projected indicia focused on the translucent screen 2. It is to be understood that the various mirrors are so located that there will be a fixed focus with all of said reflectors. The motor 46 is then turned on to cause the shaft 44 and Geneva wheel 41 to be continuously rotated. The intermittent engagement of the pin 42 with the star wheel 40 will intermittently rotate the shaft 37 together with the sprocket wheels 25, cam member 36 and gear 54.

Rotation of the shaft 37, therefore, together with the sprocket wheels 25, cam member 36 and beveled gear 54, causes the said film to be moved and the mirrors 5, 6 and 7 to be simultaneously rotated. The extent of such movement is such as to intermittently advance each section of reading matter or symbols on the film successively into alignment with the framing opening 28 and to simultaneously move the mirrors 5, 6 and 7 into alignment with the light rays projected by the projection lenses 18. Prior to this movement of the film and the mirrors 5, 6 and 7, as the case may be, the cam member 36 is so positioned as to allow the spring member 38 to move the baffle shutter or plate 30 over the opening 28. At the completion of each of said intermittent movements of the film 3 and mirrors 5, 6 and 7, the risers 39 engage the rock lever 31 and move the said baffle plate or shutter 30 clear of the opening 28. This causes the reading matter or fixation symbols aligned with the opening 28 to be projected on to the translucent screen 2. Continued operation of the device causes successive alignment of new indicia with the opening 28 and projection thereof onto the translucent screen 2. These projections occur from left to right on the screen in the direction of normal reading and thereby produce a line of reading matter correlated in reading context by intermittent exhibitions of selected groups of said indicia in the direction of reading. The first group of indicia appears on the left hand side of the screen. This group is in effect blanked out and the following set of indicia is next exposed or exhibited at the center of the screen, etc. These successive exhibitions occur in such a manner that the eyes are caused to move in step by step progression during said exhibitions with none of the moving parts of the device visible. The duration of blanking out depends upon the length of the dwell areas 61 on the cam member 36. These dwell areas are between the various risers 39 on said cam. It is to be noted that a sharp drop 62 is provided on the side of each of said risers 39 so that a quick closing of the opening 28 by the baffle plate 30 will occur at the completion of each successive exhibition. The operation of the device illustrated in Fig. X is generally similar to that set forth above.

The fixation indicia or symbols may be in the form of white letters on a black background or black letters on a white background, depending upon the nature of the film 3 which is used. The film may be in positive or negative form to produce this result. It is also to be understood that the fixation indicia or symbols may be of different colors on a dark background, or may be in the form of black letters or symbols on a different colored background. The color of said background or indicia may be controlled by suitable color screens which may be substituted for the filter 58 or used in combination therewith or a colored film may be used.

It is to be understood that the said translucent screen 2 may be omitted and the indicia may be projected onto a separate screen positioned at a considerable distance from the device, if desired.

The exercising treatment and reading training is brought about by setting the patient or patients before the translucent screen and having the patient or patients view said intermittently exhibited sections of indicia and read the context thereof or, if the patient cannot read, to view successively exhibited symbols which may have any character which may be identified by the patient.

During the intermittent exhibitions the eyes successively move from left to right simulating the movements thereof during reading and because of the fact that the indicia are intermittently exhibited and blanked out the patient is more or less urged to move his eyes progressively with the progressive movement of said intermittent exhibitions. Because of the fact that the progressively exhibited indicia are blanked out, the eyes will have no tendency to regress during said training. This, therefore, tends to overcome any regressive habit which the patient may have.

The exercising is directed to the muscular structure of the eyes through the intermittent movement of the eyes and tends to strengthen and innervate the same.

The device may be used with or without prisms before the eyes. The advantages of the use of prisms are clearly disclosed in Patent No. 2,110,344, issued March 8, 1938.

It is to be understood that all of the exercising treatments disclosed in the above patent may be accomplished with the device embodying the invention.

The use of different colored screens, such as red, green, yellow, etc., introduce different retinal stimulations which also cause different reactions of the eyes and thereby produce different treatments, all of which are known to the art.

In Fig. VIII there is diagrammatically illustrated modified form of the device embodying the use of a projector 4 having a plurality of mirrors, such as illustrated in Fig. VII, together with a plurality of mirrors 9, 11 and 14 and a translucent screen 2. The device in this instance is so constructed that the span of projection as reflected by the reflectors 9, 11 and 14, as illustrated at A, B and C respectively, overlap each other. This provides means whereby a film 3', such as shown in Fig. IX having a different number of word groups in each framing, as illustrated at 61, 62 and 63 may be used. It will be noted that when the first framing 61 is projected onto the screen 2 the full width of the projected span A is used. When the frame 62 is projected onto the screen 2 only the right end of the projected span B is used, as illustrated at 64. When the framing 63 is projected onto the screen 2, only the right end of the projected span C is used, as illustrated at 65. The number of words in each framing is thereby varied. This varying is so controlled, however, as to avoid having the indicia overlap each other during each intermittent exhibition or overlie the portion of the screen which a portion of the previously projected indicia occupied. This thereby causes the eye to advance in step by step progression, similar to the device previously described above, the only difference being that the text of the word groups of each exhibition may be controlled. It is obvious that if only one word, such as illustrated at 66, were projected to the left side of the projection span A, a group of words, such as illustrated at 67, could be projected on the projection span B, it being understood, as stated above, that the word groups could be so projected as to be in spaced progression in the direction of reading. By varying and controlling the lengths of the word groups at each framing of the intermittently advanced film and by having the spans of projection arranged, as illustrated in Fig. VIII, a different length or group of words or indicia may be intermittently projected on the screen 2. The spacing of the groups in each span of projection is controlled by the film as illustrated in Fig. IX. With this arrangement, it is possible to vary the amount of indicia exposed at each recognition span so that if the entire width of one span is not utilized during one exhibition of indicia, the unoccupied portion may be utilized during the next exhibition of indicia.

It is apparent from the above that films, such as illustrated at 3', having groups of indicia of different lengths thereon, may be used.

In Fig. III, there is diagrammatically illustrated at 68 a plurality of shutter members, each having a pivotal connection 69 to a suitable bearing 70 adjacent each of the reflectors 9, 11 and 14, and which may be moved as illustrated by the dotted lines 71 to a position intermediate the reflective means 5, 6 or 7, as the case may be, and the respective reflectors 9, 11 or 14. A suitable lever or other means 72 is provided for operating said shutter members separately. This arrangement provides means whereby the indicia projected onto the screen 2 by said reflectors may be blanked out.

It is to be understood that the shutter arrangement described above, is set forth only by way of illustration as to how the effectiveness of each of said reflectors may be separately controlled, any other suitable arrangement that will accomplish the same result may be used.

The housing 14' of the projector is connected with a chamber 73 having a screen-like wall 74. A fan 75 mounted on the motor 48 lies within said chamber 73 and is adapted to blow air outwardly of said chamber, as illustrated by the arrow 76, and simultaneously draw hot air outwardly of the housing 14', as illustrated by the arrow 77. This arrangement provides means for automatically reducing the temperature internally of the housing 14'.

The speed of the motor may be controlled through the use of a suitable rheostat 78 or by a governor or other means.

The purpose of controlling the speed through the use of a rheostat or governor is to provide means whereby the exposures of the fixation indicia may be lengthened or shortened. As the efficiency of the muscular structure of the eyes increases through the exercising treatments brought about through the intermittent and progressive exposure of fixation indicia the speed of exposure is increased so as to increase the stimulation of said exercising treatment. The varying of the recognition span also increases the stimulating effect of said exercising. By increasing the number of words in selected exposures the eyes of the individual being treated are stimulated through the effort of the eyes to follow and assimilate the entire context of the indicia. This control of recognition span and control of the speed therefor is extremely important to the efficiency of the exercising treatment and building up of the muscular structure of the eyes and the general reading ability of the individual. Different colors also increase or decrease the stimulating effect of the fixation indicia in accordance with the particular requirements needed for the individual under treatment. The general arrangement greatly simplifies treatments of this nature and provides means whereby no form character other than the immediate fixation means at each exposure is visible so that the successive progressive exhibitions will tend to inhibit a general habit whereby the individual will overcome any tendency to regress during ordinary reading.

From the foregoing description, it will be seen that simple, efficient and economical means are provided for accomplishing all of the objects and advantages of the invention.

Having described my invention, I claim:

1. In a device of the character described, the combination of a projector having a shutter member therein, and a plurality of reflective members for directing light projected by said projector onto a viewing screen, means on said projector for supporting a film having indicia thereon, and mechanical means interconnected with the shutter member, certain of said reflective members, and said film support for intermittently and successively moving said shutter, said certain reflective members and said film support on said projector, whereby the said shutter is moved into said beam of light to cut off said beam from said film and out of said beam of light to permit the passage of light to said film, and successive portions of said film are presented to the said beam of light to project the indicia of said successive portions of the film onto said reflective means.

2. In a device of the character described, the combination of light projection means having a shutter member therein, means associated with said projection means for intermittently moving a film having sections of indicia thereon for alignment with said light projection means, a plurality of reflective members separately alignable with said projected light for reflecting said light rays during said intermittent projections of said sections of indicia, and mechanical means interconnected with said shutter member, certain of said reflective members, and said film for intermittently and successively moving said shutter, said certain reflective members, and said film whereby the said shutter is moved into said beam of light to cut off said beam and out of said beam of light to permit the passage of light to said reflectors and successive portions of said film are presented to the said beam of light to project the said indicia onto said reflective means.

3. In a device of the character described, the combination of a light projector having a shutter member and means for supporting a film having indicia thereon to be projected by said projector, a viewing screen, reflective means comprising movable and stationary portions aligned with said projector, with the movable portions adapted to direct the projected indicia to the stationary portions to be reflected thereby onto said viewing screen, means for moving said movable portions of the reflective means into and out of alignment with the indicia projected by said projector, and mechanical means interconnected with the shutter member, said movable portions of the reflective means and said film for intermittently and successively moving said shutter, said movable reflective portions, and said film whereby the said shutter is moved into said beam of light to cut off said beam and out of said beam of light to permit passage of light through said film to said screen and successive indicia are presented to the said beam of light so as to be projected onto said reflective means and said viewing screen.

4. In a device of the character described the combination of a light projector having means for supporting a film with indicia thereon to be projected by said projector, reflective means comprising movable and stationary portions aligned with said projector with the movable portions adapted to direct the projected indicia to the stationary portions to be reflected thereby onto a suitable viewing screen and means operably connected with the means for supporting the film and the movable portions of the reflective means for intermittently and successively moving said film and movable portions of said reflective means whereby successive indicia are presented so as to be projected by said projector on said reflective means.

5. In a device of the character described for use with a viewing screen, the combination of a source of illumination, a projection system embodying reflective means for directing light from said source of illumination to said viewing screen, means for supporting a strip of sheet-like material having indicia thereon to be illuminated by said source of illumination and to be reflected by said reflective means onto said viewing screen, a member having a window opening therein, a shutter member movable in a direction transversely of said window opening, and means interconnected with said shutter member, said reflective means, and said means for supporting said strip of sheet-like material having the indicia thereon for intermittently moving said sheet-like material and also said shutter member relative to said window opening, and for simultaneously moving said indicia, said reflective means, and said shutter member relative to each other so that portions of said indicia, moved within the area of said window opening, will be directed onto said viewing screen by said reflective means, said indicia and said reflective means being intermittently moved so as to cause said indicia to be projected on the viewing screen in step by step progression in the direction of reading.

6. In a device of the character described for use with a viewing screen, the combination of a source of illumination, a projection system embodying reflective means for directing light from said source of illumination to said viewing screen, means for supporting a strip of sheet-like material having indicia thereon to be reflected and projected onto said viewing screen, a member having a window opening therein, a shutter member movable in a direction transversely of said window opening, and means interconnected with said shutter member, said reflective means, and said means for supporting said strip of sheet-like material having the indicia thereon for intermittently moving said sheet-like material and also said shutter member relative to said window opening, and for simultaneously moving said indicia, said reflective means, and said shutter member relative to each other so that portions of said indicia, moved within the area of said window opening, will be directed onto said viewing screen by said reflective means, said indicia and said reflective means being intermittently moved so as to cause said indicia to be projected on the viewing screen in step by step progression in the direction of reading.

7. In a device of the character described for use with a viewing screen, the combination of a source of illumination, a projection system embodying reflective means for directing light from said source of illumination to said viewing screen, means for supporting a strip of sheet-like material having indicia thereon to be illuminated by said source of illumination and to be reflected by said reflective means onto said viewing screen, a member having a window opening therein, a shutter member movable in a direction transversely of said window opening, and means interconnected with said shutter member, said reflective means, and said means for supporting said strip of sheet-like material having the indicia thereon for intermittently moving said sheet-like material and also said shutter member relative to said window opening, and for simultaneously moving said indicia, said reflective means, and said shutter member relative to each other so that portions of said indicia, moved within the area of said window opening, will be illuminated and directed onto said viewing screen by said reflective means with the contours of said indicia rendered more apparent by said illumination, said indicia and said reflective means being intermittently moved so as to cause said indicia having the contours thereof rendered more apparent by the illumination to be projected on the viewing screen in step by step progression in the direction of reading.

WILLIAM F. PECK.